Aug. 14, 1945.   J. G. CAPSTAFF ET AL   2,382,604
PRINTER FOR LENTICULAR COLOR FILMS
Filed Sept. 4, 1943

JOHN G. CAPSTAFF
ORAN E. MILLER
INVENTORS

Patented Aug. 14, 1945

2,382,604

UNITED STATES PATENT OFFICE 2,382,604

PRINTER FOR LENTICULAR COLOR FILMS

John G. Capstaff and Oran E. Miller, Rochester, N. Y., assignors to Eastman Kodak Company, Rochester, N. Y., a corporation of New Jersey Application September 4, 1943, Serial No. 501,240

3 Claims. (Cl. 88—24)

The present invention relates to lenticular color films and particularly to a system for making copies of such films. It deals especially with the copying by projection of originals made with a three band filter when the copies are to be projected with a five-band symmetrical filter.

Lenticular color films are usually exposed through a three band filter having red, green and blue parallel bands of substantially equal width and combined with an antifringer. It is hard to devise a practicable antifringer for a five-band symmetrical filter. It is frequently desirable to print such films by means of a five-band symmetrical filter in order to minimize certain disadvantages in projection of the lenticular film. In addition, the screen is more uniform in color, and color fringes due to defects of the projection lens are minimized. Also the effect of "cat eye" is reduced. Certain objectionable features of lenticular film, such as color fringes caused by the projector objective being poorly focussed, are minimized when a five-band filter is used having bands of the same color on the outer edges. For example, when a five-band filter is used having blue bands outermost where parallax displacement is greatest, the color fringe is less apparent because blue light is less luminous than red or green. A filter of this type together with its advantages is described in Capstaff U. S. Patent 2,210,881, granted August 13, 1930.

It is, therefore, an object of the present invention to provide a system for printing lenticular film exposed through a three-band filter onto lenticular film through a five-band symmetrical filter. A further object is to provide a novel three-color filter for obtaining more even illumination of the five-band symmetrical filter used in printing. Other objects will appear from the following description of our invention.

These objects are accomplished by use of the system described in detail below.

Figure 1:
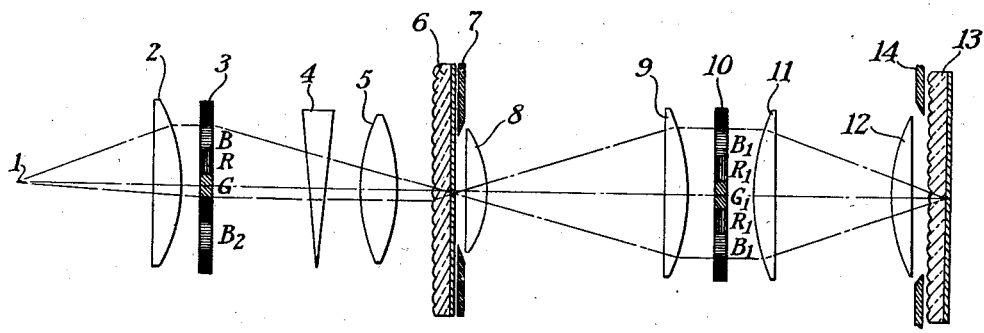
Figure 2:
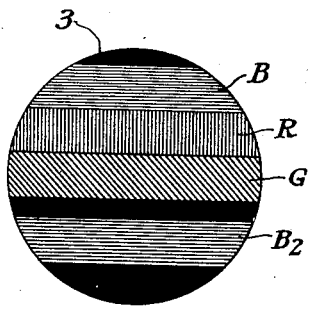
Figure 3:
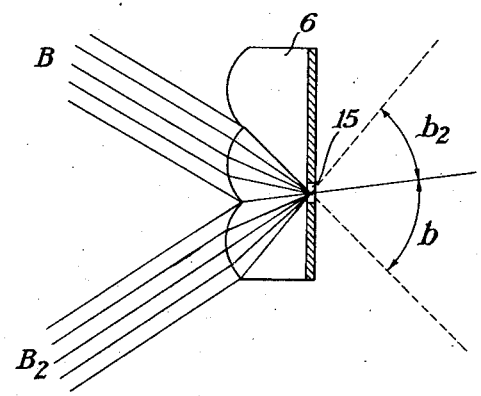

In the accompanying drawing, Fig. 1 is a schematic diagram of the optical arrangement used for printing. Fig. 2 is a plan view of the special three-color filter used in illuminating the original film. Fig. 3 is a diagram showing the path of the light rays through the special three-color filter and the original film.

As shown in Fig. 1, light from the source 1, which is any suitable source of high intensity illumination such as a tungsten lamp, is imaged by means of the condenser 2 onto the original lenticular film 6 in the gate 7. The illuminating light rays pass through the filter 3 having transparent colored bands B, R and G and also a separate colored band $B_2$ separated from the bands B, R and G by an opaque zone.

A plan view of filter 3 is shown in Fig. 2. As shown therein, the colored blue band B, red band R and green band G are separated by an opaque zone from the blue band $B_2$. The bands B, R and G are eccentrically placed with respect to the center of the filter and the band $B_2$ is separated from them by a distance corresponding to the separation of the corresponding bands in the emulsion layer of the original film 6. The reason for this will be apparent from the following description of our invention. The bands B, R and G need not be arranged in the order shown but the band $B_2$ must be of the same color as the outermost band of the three-color system. That is, if the band B, shown in Fig 2, is green instead of blue, the band $B_2$ should also be green.

Filter 3, as shown in Fig. 1, is placed near the condenser 2 and is imaged at infinity by the collimator lens 5. Wedge 4 deviates the illuminating beam so that the decentered three-band system B—R—G is shifted optically to a central position on the optical axis. Original film 6 in the gate 7 is thus illuminated by the filter 3, the R—G—B part of which subtends the same angular space as did the camera filter system.

A decentered condenser and light source may be substituted for the centered system and wedge of Fig. 1. From the standpoint of simplicity of mechanical design, however, the centered system is preferable.

The original film 6 is imaged by a pair of objectives 9 and 11 onto the copy film 13 in the gate 14. Collimating lenses 8 and 12 cause the five-band filter 10 to appear at infinity when viewed from gates 7 and 14. Filter 10 is a five-band symmetrical system geometrically similar having a green band $G_1$, red bands $R_1$, and blue bands $B_1$, and subtending the same angle at the film 13 as the projection filter and projection lens system through which the copy film is to be projected. Filter 10 is described in Capstaff U. S. Patent 2,210,881.

There is a necessary correlation between the arrangement of colors in the camera and projection filters. It is necessary to carry this correlation through the printing system. However, as long as the proper geometrical correlation between them is maintained, the arrangement of the colors in the printing filters 3 and 10 may be chosen at will. We have shown the blue filters outermost, the red filter in the intermediate zone, and the green filter in the center of the lens. It is possible, however, to use any desired arrangement of the filters, as, for example, placing the blue filters outermost, the green filter in the intermediate zone, and the red filter in the center of the lens.

The collimator lenses 8 and 12 may be omitted and their function performed by curving the gates 7 and 14 as shown in Seymour U. S. Patent 1,912,-661, granted June 6, 1933. The centers of curvature of the respective gates lie in the centers of the virtual images of filter 10 as seen from the respective gates. The collimating lens 5 must then be made stronger so that it alone has sufficient power to image filter 3 onto filter 10. Now because lens 5 is not exactly in the gate 7, but a finite distance from it, it is necessary in using the curved gates to reduce the width of the filter bands in the illuminating filter 3 by the ratio $$\frac{r}{r+d}$$

where $r$ is the radius of the gate 7 and $d$ is the distance of the lens 5 from the gate 7, lens 5 remaining the same distance from the filter 3, as arranged for with the flat gate 7.

We have found that if the width of the middle band of the system B—R—G of filter 3 is made relatively narrower than in the color filter, color saturation is improved for practical reasons. Making the outer filters wider has a similar effect. Color saturation is also improved by superimposing opaque bands between the color filter zones of filter 3.

The second blue band $B_2$ of filter 3 corresponds to the B—R—G system of an adjacent embossed lens and must be spaced from the three banded group by an amount corresponding to the bands in the emulsion layer of the original film 6. The reasons for this are apparent from a consideration of Fig. 3 of the drawing. As shown therein, the embossed lenses on original film 6 receive illumination from the filter 3 as indicated by rays B and $B_2$ coming from the corresponding colored areas of the filter 3. Film 6 also receives illumination from the colored areas R and G of filter 3 but these are omitted in Fig. 3 for purposes of simplicity. The areas indicated by B in Fig. 3 are focused behind each lenticule on the emulsion layer of the film 6 as indicated at 15. If this portion of the film was exposed originally and is transparent in the film 6, the rays B pass through the film and subtend an angle $b$ after passing through the film. Rays from the blue band $B_2$ of filter 3 strike the film 6 as indicated by arrows $B_2$ in Fig. 3 and are focused at 15 in the emulsion layer of film 6. It is thus necessary that the band $B_2$ of filter 3 be separated from the three color system by an amount such that the rays from it striking an adjacent lenticule of the film 6 will be focused at the same point as the rays from the outermost band of filter 3 on the opposite side of the axis. That is, rays from B and $B_2$ in filter 3 must focus at the same point in the original film 6. After passing through the film 6, rays $B_2$ shown in Fig. 3, subtend the angle $b_2$.

As shown in Fig. 3, rays passing through the film 6 at $b$ illuminate only the lower half of filter 10. Only the lower zone $B_1$ of the two zones $B_1$ $B_2$ of filter 10 is, therefore, illuminated by the zone B of filter 3. By use of the extra zone $B_2$ in filter 3, the rays $b_2$ are caused to illuminate the zone $B_1$ of filter 10. Because the zones $R_1$ and $G_1$ in filter 10 are located near the optical axis, there is no difficulty in illuminating these areas by the areas R and G of filter 3.

Objectives 9 and 11 may be of aperture f/1.6 when the embossing of the copy film is only f/2.0, because in the symmetrical filter system the images of the outer filters may overlap in the emulsion layer without harm. On the other hand, if, for practical reasons, lenses of higher aperture than f/2.0 are not available, the images of the outer bands of filter 10 may be reduced in width, the only requirement being that they fill the emulsion layer. Such copy is identical to one made with f/1.6 objectives and may be projected with an f/1.6 lens. Printing objectives, therefore, need have an aperture equal only to that of the embossed lenses of the printing film.

For the purpose of simplification, the diagram of Fig. 1 omits the usual mechanisms associated with printers such as the shutter, film moving means and the supports for the optical and mechanical parts. It is assumed that these mechanisms are so well known as not to require description. It is also understood that any well known means may be used to eliminate the moire pattern resulting from the optical superposition of the two film networks of embossed lenses.

One feature of our system that must be recognized is that the color ratio should be balanced by modification of the transmissions of the filters of system 3 and not those of the system 10 because much better color separation is thus obtained. The reason for this is that since one filter always transmits some of the radiation passed by the other filters, and this produces a loss in color saturation, this loss may be greatly exaggerated if the system 3 is greatly unbalanced and the balance is corrected at filter system 10. This is because the rays of different colors become mixed after going through the original films. The unbalance in filter 3 may cause a greater proportion of an unwanted color to fall on one of the bands of filter 10. Since the transmission for the unwanted color is a constant fraction of the transmission for the desired color, this may give rise to degradation of the color separation.

It will be understood that the spectral colors employed in practicing our invention may vary considerably and that the colors red, green and blue have been chosen to illustrate the invention merely because colors approximating these are the ones most generally employed. It will also be understood that our invention is to be taken as limited only by the scope of the appended claims.

We claim:

1. An optical system for use in making prints from an original lenticular color film exposed through a three-band filter, onto lenticular film exposed through a five-band symmetrically-colored filter having linear bands, the outermost of which are the same color, which comprises an illuminating system for said original film in which is a four-band color filter between a light source and the original film and imaged at infinity on the lenticular side of the original film, three bands of said four-band filter having the same color sequence as the filter used in taking and the fourth color band being of the same color as the outer bands of said five-band filter and separated from the three color bands by an opaque zone of a width corresponding to the separation of the images representing the same color as said fourth color band in the emulsion layer of said original film, means for illuminating said five-band filter with light rays from said original film, and means for focusing said light rays on a lenticular printing film.

2. An optical system for use in making prints from an original lenticular color film exposed through a three-band film, onto lenticular film exposed through a five-band symmetrically-colored filter having linear bands, the outermost of which are the same color, which comprises an illuminating system for said original film in which is an eccentrically-placed filter between a light source and the original film and imaged at infinity on the lenticular side of the original film and having blue, red and green bands in the same sequence as in the filter used in taking, the blue band being farthest from the optical axis of the system, and a separate blue band on the opposite side of the optical axis separated from the blue, red, and green bands by an opaque zone of a width corresponding to the separation of the images representing blue light in the emulsion layer of said original film, an optical wedge in said system between said eccentrically-placed filter and said original film for centering said blue, red, and green bands on the axis of said system, means for illuminating said five-band filter with light rays from said original film and means for focusing said light rays on a lenticular printing film.

3. An optical system for use in making prints from an original lenticular color film exposed through a three-band film, onto lenticular film exposed through a five-band symmetrically-colored filter having linear bands, the outermost of which are the same color, which comprises an illuminating system for said original film in which is an eccentrically-placed filter between a light source and the original film and imaged at infinity on the lenticular side of the original film and having blue, red and green bands in the same sequence as in the filter used in taking, the blue band being farthest from the optical axis of the system, and a separate blue band on the opposite side of the optical axis separated from the blue, red, and green bands by an opaque zone of a width corresponding to the separation of the images representing blue light in the emulsion layer of said original film, said five-band filter having blue bands farthest from the center, an optical wedge in said system between said eccentrically-placed filter and said original film for centering said blue, red and green bands on the axis of said system, means for illuminating said five-band filter with light rays from said original film and means for focusing said light rays on a lenticular printing film.

JOHN G. CAPSTAFF.
ORAN E. MILLER.